United States Patent

[11] 3,610,717

| [72] | Inventor | Robert G. Van Nostrand |
| | | 311 Northmoor Drive, Ballwin, Mo. 63011 |
| [21] | Appl. No. | 800,931 |
| [22] | Filed | Feb. 20, 1969 |
| [45] | Patented | Oct. 5, 1971 |

[54] PANELBOARD ENCLOSURE
10 Claims, 6 Drawing Figs.

[52] U.S. Cl. .................................................. 312/242, 220/3.6
[51] Int. Cl. ................................................... H01r 39/38
[50] Field of Search .......................................... 312/242; 220/3.3, 3.5, 3.6, 3.8; 292/4, 5, 6, 7, 8

[56]  References Cited
UNITED STATES PATENTS

| 3,187,526 | 6/1965 | Moler | 292/7 X |
| 3,480,344 | 10/1969 | Goodridge | 220/3.6 X |

Primary Examiner—James C. Mitchell
Attorneys—A. T. Stratton, C. L. McHale and W. A. Elchik ABSTRACT: A panelboard enclosure comprises a receptacle and a trim panel structure with improved means for removably securing the trim panel structure to the receptacle. The securing means is accessible only when the openable cover of the trim panel structure is open.

FIG.I.

INVENTOR
Robert G. Van Nostrand
BY
ATTORNEY

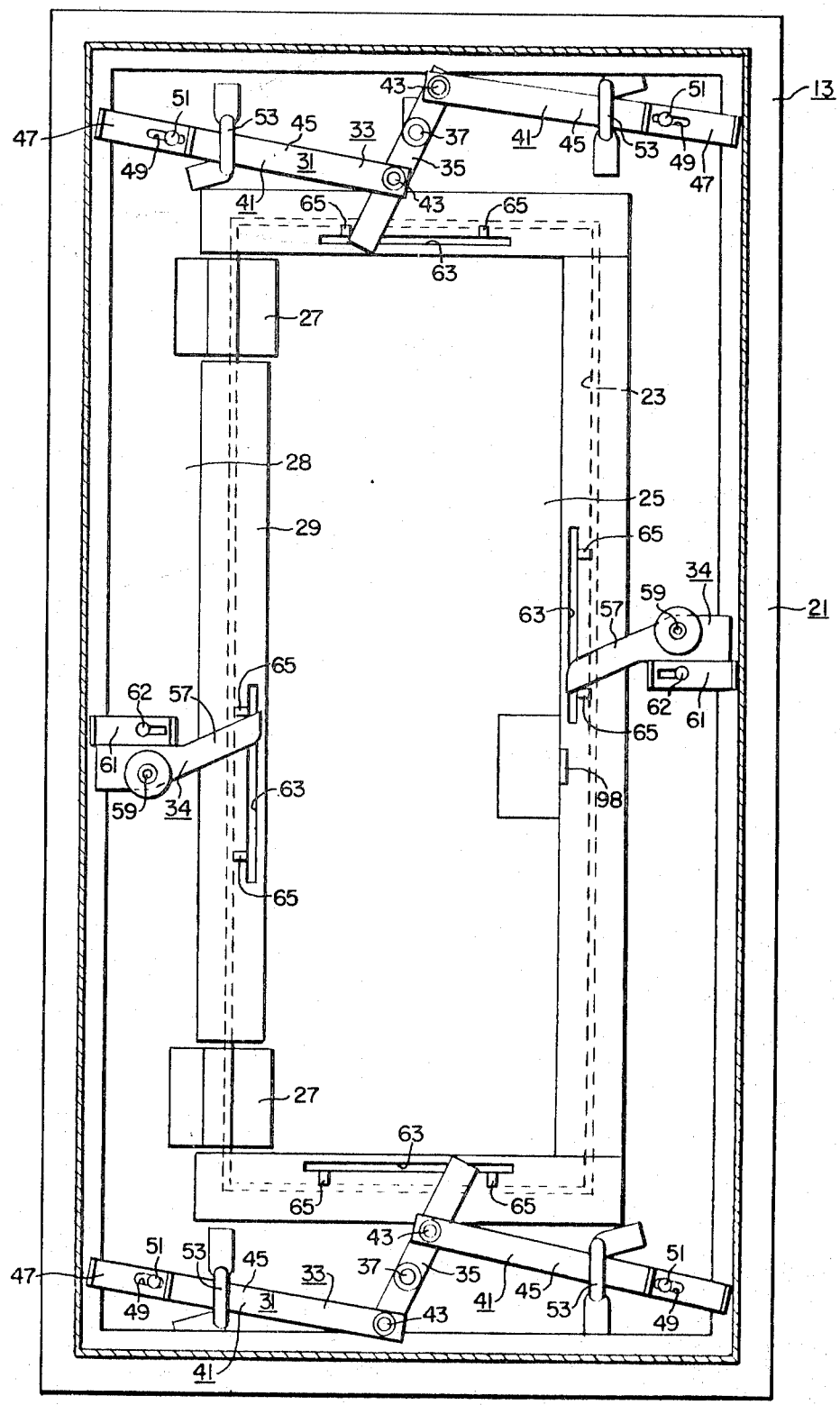

PANELBOARD ENCLOSURE

BACKGROUND OF THE INVENTION

1. Field of the Invention

Panelboard enclosures of the type comprising a trim panel with an opening therein and a cover secured to the trim panel for providing access to the interior of the enclosure.

2. Description of the Prior Art

It is old in the art of panelboard enclosures to secure a trim panel structure to a receptacle with securing means such as screws and bolts. This invention is an improvement over the prior art in that lever means is used to secure the trim panel structure to the receptacle. The lever means is accessible for operation between the securing and nonsecuring positions thereof only when the cover of the trim panel structure is in the open position.

SUMMARY OF THE INVENTION

A panelboard enclosure comprises a receptacle comprising a base and sidewall means extending from the base to an open front. The sidewall means is bent over to provide front flange means extending parallel to the base. The enclosure also comprises a trim panel structure comprising a trim panel having an opening therein and a cover movable supported on the trim panel to open and close the opening. Lever means, supported on the trim panel, comprises a plurality of lever structures each of which is movable between a nonsecuring position and a securing position. Each of the lever structures comprises a lever arm supported for pivotal movement under a slot in the trim panel and an adjustable cam arm operated by the lever arm. When the cover is in the open position, an operator can operate each of the lever structures by placing a blade through a slot in the trim panel and pivoting the lever arm from the nonsecuring position to the securing position during which movement the cam arm moves under the front flange means of the receptacle to cam the trim panel structure toward the receptacle to thereby secure the trim panel structure to the receptacle. The trim panel structure comprises stop means for limiting movement of each lever arm in each of the two positions thereof, and each of the slots extends past both limited positions of the associated lever arm so that an operator can insert a blade through the slot into the operating position when the associated lever arm is in each of the two positions thereof. Since the operator does not have access to the lever means when the enclosure cover is in the closed position, the enclosure can be locked to prevent opening of the cover and also to prevent removal of the trim panel structure from the enclosure at the installation.

BRIEF DESCRIPTION OF THE DRAWINGS

FIG 3 is a sectional view taken generally along the line III—III of FIG. 2;

DESCRIPTION OF THE PREFERRED EMBODIMENTS

Figure 1:
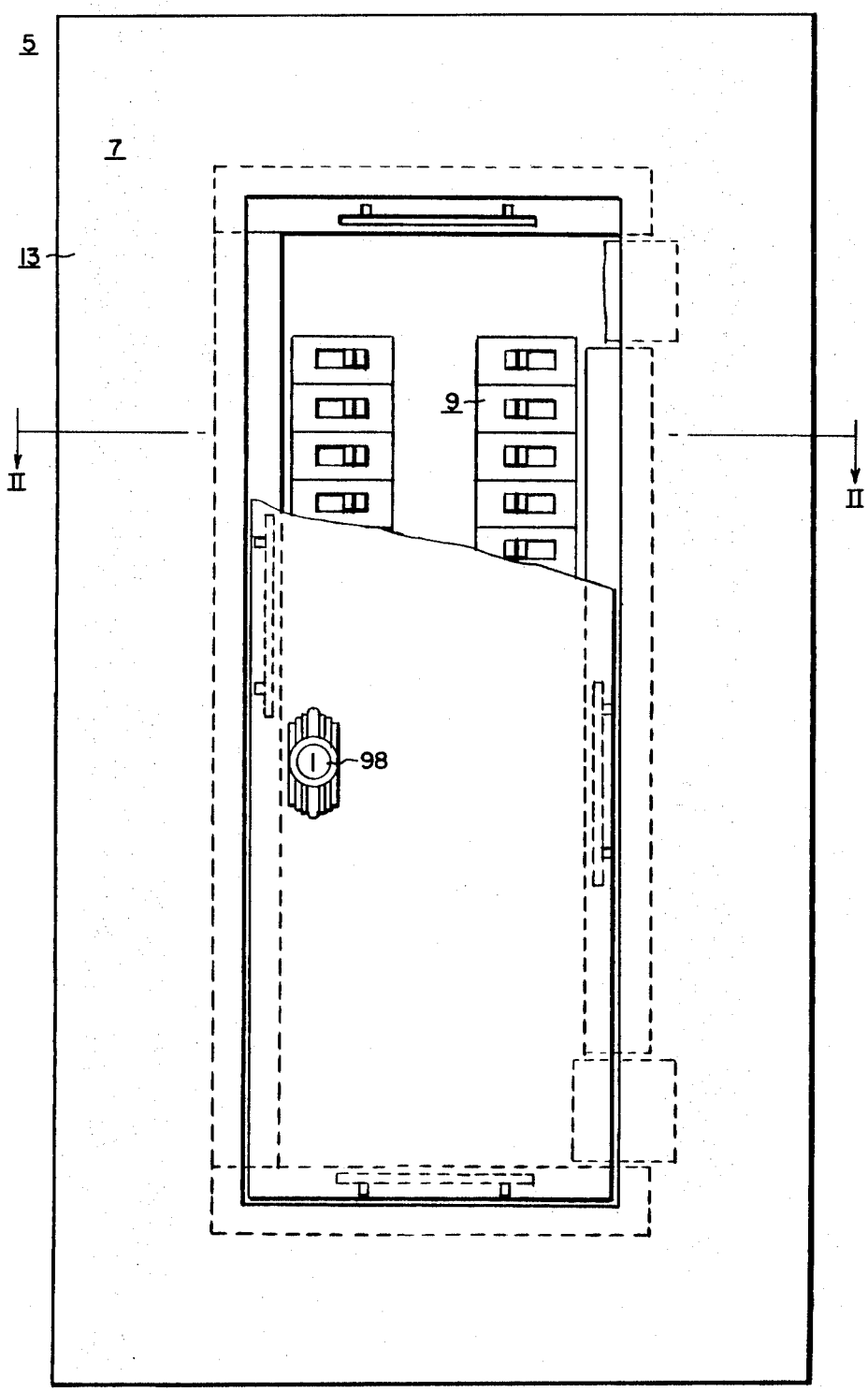
FIG. 1 is a front plan view, with parts broken away, of a panelboard constructed in accordance with principles of this invention.
Figure 2:
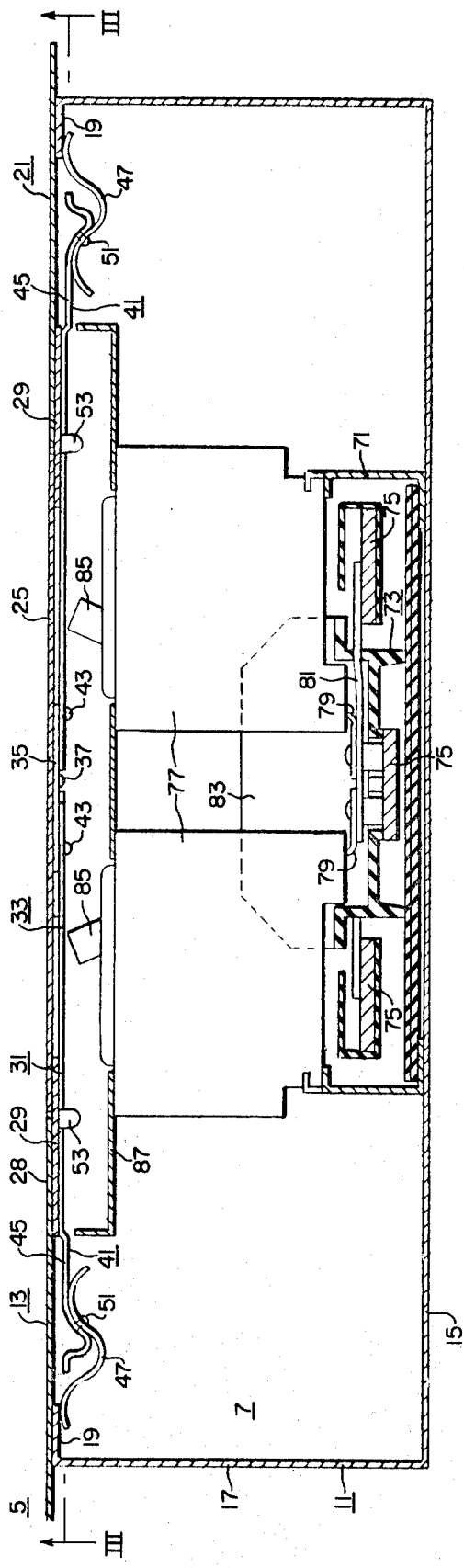
FIG. 2 is a sectional view taken generally along the line II—II of FIG. 1.
Figure 6:
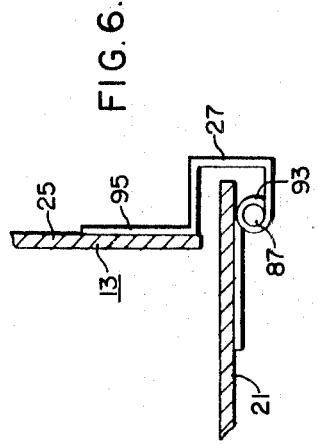
FIG. 6 is a view similar to FIG. 5 with the cover shown in the open position.

Referring to the drawings there is shown, in FIGS. 1 and 2, a panelboard 5 comprising an enclosure 7 and circuit-controlling means 9 supported in the enclosure 7.

The enclosure 7 comprises a receptacle 11 and a trim panel structure 13 secured to the receptacle 11. The receptacle 11 is a sheet-metal structure comprising a generally planar base 15 and sidewall means 17 extending frontward normal from the base 15 to an open front. The sidewall means 17 comprises four sidewalls of the receptacle. As can be seen in FIG. 2 the sidewall means 17 is bent over at the front thereof to provide front flange means 19 around the periphery of the opening extending from the sidewall means 17 generally parallel to the base 15.

The trim panel structure 13 (FIGS. 1–6) comprises a sheet metal planar trim panel 21 having a rectangular opening 23 therein and an openable cover 25 pivotally supported on the trim panel 21 by means of a pair of hinges 27. The trim panel 21 comprises a panel 28 and a plurality of plates 29 welded to the bottom surface of the panel 28 around the periphery of the opening 23. Lever means 31, comprising a pair of end lever structures 33 and a pair of side lever structures 34, is supported on the underside of the trim panel 21 for removably securing the trim panel structure 13 to the receptacle 11. Each of the end lever structures 33 comprises an elongated lever arm or operating part 35 pivotally supported, intermediate the ends thereof, on the underside of the trim panel 21 by means of a pivot pin 37. A pair of opposite cam arms or securing parts 41 are pivotally connected to each of the lever arms or operating parts 35 on opposite sides of each pivot 37 by pivot pins 43. Each of the cam arms or securing parts 41 comprises an elongated first part 45 and a cam part 47 adjustably connected to the part 45. As can be seen in FIG. 3, each of the cam parts 47 is provided with an elongated slot 49 for receiving a screw member 51 that connects the cam part 47 to the associated part 45. As can be seen in FIG. 2, the parts 45 and cam parts 47 are shaped such that when each screw 51 is loosened the associated cam part 47 can be moved longitudinally on the associated part 45 to adjust the position wherein the cam surface of the associated cam part 47 will cam against the flange means 19. With the cam part 47 in the adjusted position, the screw 51 can be tightened to secure the parts 45, 47 together. As can be seen in FIG. 3, a separate loop-support 53 is welded or otherwise fixedly secured to the undersurface of the trim panel 21 to receive the associated part 45 to support and guide the free end of the associated cam arm.

As can be seen in FIG. 3, each of the side lever structures 34 comprises a lever arm or operating part 57 pivotally supported on the trim panel 21 by means of a pivot pin 59, and a cam arm or securing part 61 adjustably supported on the lever arm 57 by means of screw 62 in the same manner as was previously described with regard to the support of the cam parts 47.

As can be seen in FIGS. 2 and 3, the plates 29 are provided with a plurality of elongated slots 63 therein. The plates 29 are provided with a pair of bent over tangs or stops 65 in proximity to the opposite ends of each of the slots 63 to engage the associated lever arm (57 or 35) to limit movement of the associated lever arm at the two positions of the associated lever arm. As can be understood with reference to FIGS. 3 and 4, each slot 63 extends past the two limited positions of the associated lever arm so that when the associated lever arm is in each of the two positions thereof a blade can be inserted down through the slot to enable an operator to move the lever arm to the next position.

As can be seen in FIG. 2, a generally U-shaped metallic supporting pan 71 is supported on the receptacle 15. Insulating support means 73 is supported on the supporting pan 71, and three elongated bus bars 75 are supported on the insulating support means 73 in a spaced relationship. A plurality of molded-case or insulating-housing type circuit breakers 77 are supported in the receptacle in two parallel columns. The circuit breakers 77 are the type described in the copending application of James P. Ellsworth et al., Ser. No. 648,288 filed June 23, 1967. Each of the circuit breakers 77 is supported at the load end thereof on the supporting pan 71. A terminal conductor 79 extends from the line end of the insulating housing of each breaker for connection to a selected one of the bus bars 75. As seen in FIG. 2, a conductor 81 is connected at one end thereof to the bus bar 75 seen on the right, and the two terminal conductors 79 of the two circuit breakers seen in FIG. 3 are connected to the conductor 81. Other pairs of circuit breakers 77 from the two columns are similarly connected to selected ones of the three bus bars 75 in a well-known manner. As seen in FIG. 2 the support means comprises a plurality of insulating barriers 83 with each insulating barrier 83 being positioned between adjacent pairs of circuit breakers 77 to provide insulation between the conductors 79, 81 of the adjacent pairs of breakers. Each of the breakers 77 comprises an insulating handle 85 that extends through a suitable opening in the front of the breaker housing to enable manual operation of the breaker. A generally U-shaped metallic shield member 87 is supported on the front of the breakers 77 with the shield 87 having opening means therein for receiving the operating handles 85. The shield 87 closes off the internal part of the receptacle while permitting manual operation of the circuit breakers in a manner well known in the art.

Figure 5:
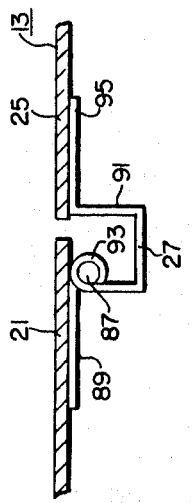
FIG. 5 is a sectional view illustrating one of the concealed hinges of the trim panel structure.

As can seen in FIG. 5, each of the hinges 27 comprises a hinge pin 87 connected to a flat support part 89 that is welded to the underside of the trim panel 21. Each of the hinges 27 also comprises a hinge part 91 having a curled portion 93 at one end thereof, which is mounted on the pin 87, and a flat supporting portion 95 at the other end thereof that is welded or otherwise fixedly secured to the undersurface of the cover 25. Each of the hinge parts 91 comprises a generally U-shaped part for clearing the edge of the trim panel 21 as the cover 25 is moved between the open and closed position seen in FIGS. 6 and 5 respectively. As can be understood with reference to the drawings, the hinge 27 is concealed from the front of the panelboard enclosure when the cover 25 is in the closed position.

Figure 4:
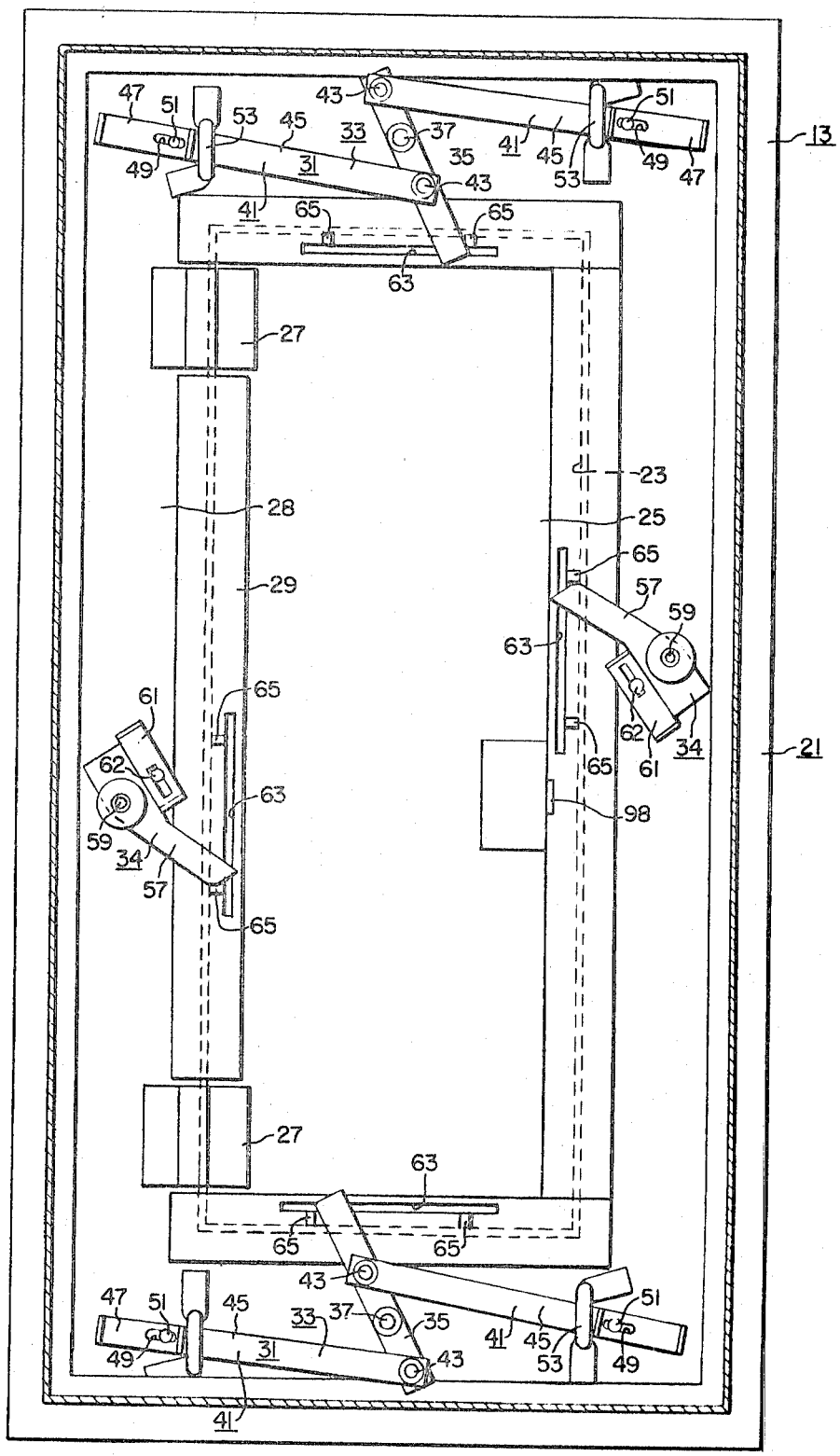
FIG. 4 is a view similar to FIG. 3 with the lever means being shown in the nonsecuring position.

During installation of the panelboard, the receptacle 11 and control means 9 are mounted in a suitable cavity in a wall at the installation. Thereafter, the trim panel structure 13, with the lever means 31 in the nonsecuring positions seen in FIG. 4, is moved into the mounted position against the flange means 19 of the receptacle. With the cover 25 in the open position, an operator can insert a blade-type tool into each of the slots 63 (FIGS. 3 and 4) and pivot each of the lever arms 35, 57 from the nonsecuring position seen in FIG. 4 to the securing position seen in FIG. 3. During these operations, the cam parts 47, 61 of the lever structures move under the flange means 19 to draw the trim panel structure 13 against the flange means 19 to thereby secure the trim panel structure 13 on the receptacle 11. Thereafter, the cover 25 can be closed and a well-known type of key-operated lock 98 on the cover 25 can be locked to prevent access to the interior of the panelboard. With the lock 98 in the locked position, it can be understood that a person does not have access to the internal lever means 31 so that a person cannot remove the trim panel structure 13 from the installation. The key-operated lock 98 can be any of a number of well-known standard locks that are used at panelboard installations. If it is desired to remove the trim panel structure 13, the lock 98 must be unlocked and the cover opened whereupon an operator can operate the lever means 31 from the securing positions seen in FIG. 3 to the nonsecuring positions seen in FIG. 4. As can be understood with reference to FIGS. 3 and 4, the tabs 65 limit movement of the lever arms 35, 57 in the two positions of the lever arms so that an operator can move a blade-type tool into an operating position in the associated slot 63 when the associated lever arm 35, 57 is in either of the two positions thereof.

When the wall cavity at the installation is deeper than the height of the receptacle 11, the mounted positions of the cam parts 47, 61, on the parts 45, 57 respectively, are adjusted, in the manner hereinbefore described, and the cam parts 47, 61, engage the undersurface of the flange means 19 to cam the trim panel structure 21 against the external wall surface, rather than against the front surface of the flange means, to mount the trim panel structure 21 at the installation.

I claim:

1. A panelboard comprising a receptacle having an open front, said receptacle comprising a generally planar base and sidewall means extending generally normal from the base toward the front of said receptacle, generally planar flange means extending from the front of said sidewall means and being generally parallel to and base, a trim panel structure comprising a generally planar trim panel having an opening therein, a cover supported on said trim panel and movable to open and close said opening, lever means supported on said trim panel on the underside of said trim panel, said lever means comprising a lever structure, said lever structure comprising a securing cam part and an operating part, said operating part being mounted on the underside of said trim panel for pivotal movement about an axis normal to the plane of said trim panel to drive said securing cam part between a securing position and a nonsecuring position, said trim panel having a slot therein, said operating part comprising a lever arm disposed under said slot whereby a tool can be placed in said slot from the front of said trim panel structure to operate said operating part when said cover is open, and with said trim panel structure disposed over said flange means said lever arm being manually operable by a tool to pivot said operating part to drive said securing cam part from a nonsecuring position with respect to said flange means to a securing position under said flange means in cooperative securing engagement with said flange means to thereby secure said trim panel structure relative to said receptacle.

2. A panelboard according to claim 1, said trim panel comprising stop means limiting movement of said lever arm at two limit positions of said lever arm, and said slot extending past the two limit positions of said lever arm whereby a tool can be inserted into operating position through said slot when the lever arm is in each of the two limit positions thereof.

3. A panelboard according to claim 2, said securing cam part operating with a camming action against the underside of said flange means when said operating part is manually pivoted to drive said securing cam part from the nonsecuring position to the securing position to thereby draw said trim panel stricture toward said receptacle to thereby secure said trim panel structure relative to said receptacle.

4. A panelboard comprising a receptacle having an open front, said receptacle comprising a generally planar base and sidewall means extending generally normal from the base toward the front of said receptacle, generally planar flange means extending from the front of said sidewall means and being generally parallel to said base, a trim panel structure comprising a generally planar trim panel having an opening therein, a cover supported on said trim panel and movable to open and close said opening, lever means supported on said trim panel, said lever means comprising a lever structure, said lever structure comprising a securing part and an operating part, said operating part being mounted on said trim panel for pivotal movement about an axis normal to the plane of said trim panel to drive said securing part between a securing position and a nonsecuring position, with said trim panel structure disposed over said flange means said operating part being manually operable to drive said securing part from a nonsecuring position with respect to said flange means to a securing position under said flange means in cooperative securing engagement with said flange means to thereby secure said trim panel structure relative to said receptacle, said lever means comprising a plurality of said lever structures, each of said lever structures being supported on the underside of said trim panel, each of said lever structures comprising an operating part and a securing part, each of said operating parts being supported on said trim panel for movement about an axis normal to the plane of said trim panel, each of said operating parts comprising a lever arm, said trim panel having opening means therein over said lever arm, said opening means in said trim panel being accessible through said opening in said trim panel only when said cover is open, whereby when said cover is open a tool can be placed through said opening means to operate said lever arms between securing and nonsecuring positions to thereby operate said securing parts between securing positions and nonsecuring positions.

5. A panelboard according to claim 4, and each of said securing parts comprising cam means operable when the associated operating part is operated to the securing position to engage said flange means under said flange means and cam said trim panel structure toward said receptacle to a secured position relative to said receptacle.

6. A panelboard according to claim 5, and each of said cam means being adjustable on the associated lever structure to adjust the camming action thereof.

7. A panelboard according to claim 5, said opening in said trim panel being a generally rectangular opening, and a separate one of said lever structures at each of the four sides of said generally rectangular opening.

8. A panelboard according to claim 4, said opening means in said trim panel being an elongated slot over each of said lever arms, said trim panel comprising a stop means at each of said elongated slots limiting movement of the associated lever arm at two limit positions of the associated lever arm, and each of said elongated slots extending past the two limit positions of the associated lever arm whereby a tool can be inserted into operating position through each slot when the associated lever arm is in each of the two limit positions thereof.

9. A panelboard according to claim 8, each of said securing parts comprising a cam part on the associated lever structure operable when the associated lever structure is operated to the securing position to engage said flange means under said flange means and cam said trim panel structure toward said receptacle to secure said trim panel structure relative to said receptacle.

10. A panelboard according to claim 9, and each of said cam parts being adjustably mounted on the associated lever structure.